United States Patent
Kelly et al.

[11] Patent Number: 6,044,145
[45] Date of Patent: Mar. 28, 2000

[54] TELECOMMUTABLE PLATFORM

[75] Inventors: Kevin Kelly, St. Charles; Michael C. Hollatz, Huntley; Timothy P. Werve, Geneva, all of Ill.

[73] Assignee: Rockwell Semiconductor Systems, Inc., Newport Beach, Calif.

[21] Appl. No.: 09/008,737

[22] Filed: Jan. 19, 1998

[51] Int. Cl.[7] ............................ H04M 3/42; H04M 3/523; H04M 11/00
[52] U.S. Cl. ........................ 379/265; 379/93.01; 379/207; 379/309
[58] Field of Search ................................ 379/93.01, 201, 379/207, 265, 266, 309, 219, 220

[56] References Cited

U.S. PATENT DOCUMENTS

| | | | |
|---|---|---|---|
| 5,036,535 | 7/1991 | Gechter et al. | 379/265 X |
| 5,073,890 | 12/1991 | Danielsen | 379/265 X |
| 5,140,611 | 8/1992 | Jones et al. | 375/219 |
| 5,268,903 | 12/1993 | Jones et al. | 370/384 |
| 5,291,551 | 3/1994 | Conn et al. | 379/265 |
| 5,335,269 | 8/1994 | Steinlicht | 379/266 |
| 5,384,841 | 1/1995 | Adams et al. | 379/266 |
| 5,392,345 | 2/1995 | Otto | 379/265 |
| 5,459,780 | 10/1995 | Sand | 379/265 |
| 5,469,504 | 11/1995 | Blaha | 379/265 |
| 5,500,891 | 3/1996 | Harrington et al. | 379/265 |
| 5,619,557 | 4/1997 | Van Berkum | 379/265 X |
| 5,778,060 | 7/1998 | Otto | 379/265 |
| 5,864,615 | 1/1999 | Dezonno | 379/265 |
| 5,889,845 | 3/1999 | Staples et al. | 379/265 X |
| 5,905,776 | 5/1999 | Shaffer | 379/265 X |

Primary Examiner—Harry S. Hong
Attorney, Agent, or Firm—Welsh & Katz, Ltd.

[57] ABSTRACT

A portable apparatus and method of providing a communication interface between a local agent and an automatic call distributor at a remote location through a first and second path of the public switched telephone network. The apparatus includes a portable enclosure and a voice tranceiver disposed within the portable enclosure and coupled to the first path of the public switched telephone network. The apparatus further includes a data transceiver disposed within the portable enclosure and coupled to the second path of the public switched telephone network.

36 Claims, 2 Drawing Sheets

TELECOMMUTABLE PLATFORM

FIELD OF THE INVENTION

The field of the invention relates to multi-channel telecommunications platforms and more particularly to portable voice and data processing devices with remote data servers.

BACKGROUND OF THE INVENTION

Automatic call distribution systems are known. Such systems are typically used in an organizational context as a means of distributing telephone calls among a group of agents of the organization.

Often the organization disseminates a single telephone number to its customers and to the public in general as a means of contacting the organization. As calls are directed to the organization from the public switch telephone network (PSTN), the automatic call distribution system directs the calls to its agents based upon some algorithm, typically based upon availability. For example, where all agents are consider equal, the ACD may distribute the calls based upon which agent position (telephone) has been idle the longest.

In order to distribute incoming calls from the PSTN to the available agents, the interaction of a controlling computer with a switching fabric of the ACD becomes essential. Often a connection to a local PSTN is in the form of a number of trunk connections. Each of the trunk connections is monitored by the controller for incoming calls. Where a call is detected, the controller searches for and selects an idle agent. Upon selecting an agent, the controller commands the switch to form a connection between the incoming trunk and selected agent.

In more complicated systems, the organization may use a number of telephone numbers to identify different individuals and functions within the organization. Each telephone number may be assigned to a particular incoming trunk or group of incoming trunk lines. As such, the controller may be required to recognize a call target based upon an identity of an incoming trunk line and route the call accordingly.

In other systems, the ACD of an organization may receive calls directed to different call targets over the same trunk lines. In such a case, the call target may be identified to the ACD by a pulse code modulated (PCM) signal transferred from the PSTN to the controller of the ACD by a dialed number identification service (DNIS) operating from within the PSTN.

In systems associated with service organizations, where many calls are received and handled by many agents, it may be important for an agent to have ready access to customer files. In such a situation, a database is maintained of existing customers. Customer records may be displayed on agent terminals as the agents converse with specific customers. In some cases, the customer may be identified to the database for display of records on the terminal by the agent entering a customer identifier into a keyboard associated with the terminal. Alternatively, the controller of the ACD may transfer an identifier of the customer to the database based upon an automatic number identification (ANI) facility, operating from within the PSTN.

Where ANI is used, the controller of the ACD receives the ANI digits (identifying the caller via the caller's telephone number) at the same time the call arrives from the PSTN. Upon selecting an agent, the controller may transfer a call to a queue for the selected agent or directly to the selected agent. At the same time that the call is delivered to the agent, the controller sends an identifier of the selected agent and ANI number of the customer to a controller of the database (the host). The host, in turn, displays the customer records via a computer monitor of the selected agent at the same time the call is delivered.

As a further feature, calls may be transferred among agents. Where a first agent finds that he or she cannot help a particular customer, the agent may activate a key on a keyboard of the agent and may enter an identity of another agent or agent group that may be better able to help the customer. The controller of the ACD may immediately connect the call to the newly identified agent, or may place the call in a queue until the identified agent becomes available.

In either case, the controller transfers a message to the host identifying the previous and newly identified agent. Since the host knows the identity of the customer displayed at the terminal of the previous agent, the host may now display those same customer records at the terminal of the newly selected agent.

Where a call is placed in a queue, the ACD controller may monitor a total time that the call has been in the queue. Where the time exceeds a threshold value, the controller may transfer (overflow) the call to a newly selected agent at another less heavily loaded ACD (overflow ACD) within the same organization. The controller of the transferring ACD transfers DNIS and ANI information as well as a call sequence number assigned by the transferring ACD to the overflow ACD. The overflow ACD, upon receiving the call, transfers the information to the host including an indication that the call is an overflow call. The host in turn then polls each ACD to identify the transferring ACD and any newly created call records created by the transferring ACD.

While the existing method of ACD operation is relatively satisfactory, it is dependent upon a relatively close proximity of agents to the ACD. Where an agent is not located proximate the ACD, a voice channel used by an agent must be shared for transmision of data. Sharing a voice channel with a terminal may result in lost voice information or an increased time necessary for data exchanges. Accordingly, a need exists for a means of providing improved voice and data connections between ACDs and remotely located agents.

SUMMARY

A portable apparatus and method of providing a communication interface between a local agent and an automatic call distributor at a remote location through a first and second voice path of the public switched telephone network. The apparatus includes a portable enclosure and a voice tranceiver disposed within the portable enclosure and coupled to the first path of the public switched telephone network. The apparatus further includes a data transceiver disposed within the portable enclosure and coupled to the second path of the public switched telephone network.

DETAILED DESCRIPTION OF AN EMBODIMENT

Figure 1:
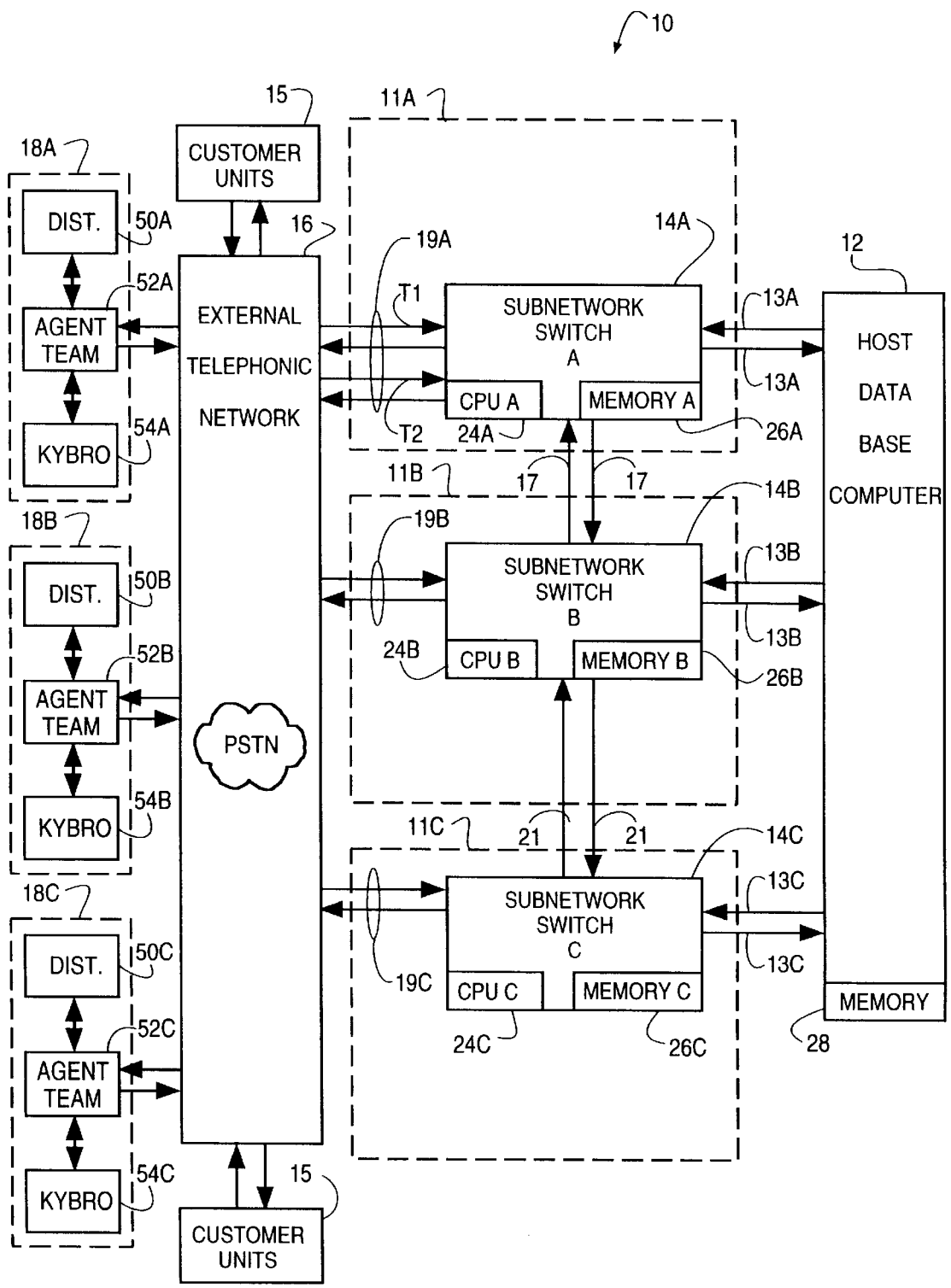
FIG. 1 is a block diagram of an automatic call distribution system and commutable platform in accordance with an embodiment of the invention.

FIG. 1 is a block diagram of an automatic call distribution system 10 in accordance with an embodiment of the invention. Under the embodiment, a first, second and third internal network 11A, 11B, 11C are connected to a host database computer 12 and the PSTN 16. Internal networks 11A, 11B, 11C may be located at geographically diverse locations and may be interconnected one-to-another by an appropriate interconnecting group of private lines 17, 21 (e.g., leased lines, virtual private lines, microwave links, dedicated T1 lines, etc.). Similarly, the internal networks 11A, 11B, 11C may be interconnected with the host 12 through an appropriate data link 13A, 13B, 13C (e.g., leased lines, virtual private lines, microwave link, the Internet, digital packet switching, etc.).

The internal networks 11A, 11B, 11C may be connected to the PSTN 16 through a number of trunk lines 19A, 19B, 19C. The PSTN 16 may offer service on the trunk lines 19A, 19B 19C in association with services such as ANI and DNIS. Call control, call maintenance, and call set-up may be accomplished by in-band signalling over the trunk line itself or over an associated control channel.

DNIS information supplied by the PSTN 16 is useful for the internal networks 11A, 11B, 11C where inbound calls to the internal networks 11A, 11B, 11C may be directed to any of a large block of telephone numbers assigned to each of the internal networks 11A, 11B, 11C. This may be useful where the block of numbers to the internal network (e.g., 11A) is connected through the trunk lines 19A in rotary fashion, so that when the calling party from the PSTN appears, for example, on trunk T1, it can be determined whether the calling party was, in fact, calling the telephone number corresponding to trunk T1 or was, in fact, calling the telephone number corresponding to trunk T2 and was rotated down to the next available trunk, T1.

With regard to inbound calls, the switches 14A, 14B, 14C function to selectively interconnect calls from external customer units 15 of the external PSTN 16 to agents 18A, 18B, 18C associated with the internal networks 11A, 11B, 11C. As such, each switch 14A, 14B, 14C, functions as an automatic call distributor within its own internal ACD network 11A, 11B, 11C.

Each of the agents 18A, 18B, 18C are shown connected to the external telephonic network 16. While each agent (e.g., 18A) may be shown in terms of a single agent, it may be assumed that the agent position 18A shown in the upper-left corner of FIG. 1 may be one of many agents associated with a particular ACD (e.g., 11A).

Further, under one illustrated embodiment of the invention, it may be assumed that any particular agent (e.g., 18A) is associated with a particular port of its associated switch (e.g., 14A). How the agent 18A becomes initally connected to that port will be explained later.

The switches 14A, 14B, 14C are controlled by central processing units, or CPUs, 24A, 24B, 24C, in conjunction with peripheral memory devices 26A, 26B, 26C. Control of the switches 11A, 11B, 11C and communications with the host 12 and PSTN 16 may be accomplished generally as described in U.S. Pat. No. 5,268,903, and U.S. Pat. No. 5,140,611, both to Jones, and both incorporated herein by reference. Routing of calls to agents 18A, 18B, 18C and overflow of calls may be accomplished generally as described in: U.S. Pat. No. 5,335,269 to Steinlicht et al.; U.S. Pat. No. 5,365,581 to Baker et al.; and U.S. Pat. No. 5,384,841 to Adams et al., all incorporated herein by reference.

During operation, the CPUs 24A, 24B, 24C monitor each port of the switch 14A, 14B, 14C for changes in status. A change in status may be an agent unit 18A, 18B, 18C going off-hook to make a call, an agent unit 18A, 18B, 18C hanging up after a call, or it may be a call alerting tone detected on a trunk 19A, 19B, 19C alerting the CPU 24A, 24B, 24C to the presence of an incoming call.

Where the status change is an agent 18A, 18B, 18C hanging up, the CPU 24A, 24B, 24C acts to tear-down the call connection within the switch 14A, 14B, 14C between the agent at a first port of the switch and a second party to the conversation communicating through a second port of the switch 14A, 14B, 14C. Upon tear down of the connection, the CPU 24A, 24B, 24C also sends a message to the host, notifying the host of termination of the call connection. The message to the host 12 would include at least the identity of the agent 18A, 18B, 18C.

Where the status change is an agent 18A, 18B, 18C going off-hook, the CPU 24A, 24B, 24C interprets such change as preparation for the placment of a telephone call. As such, the CPU 24A, 24B, 24C prepares to receive a set of dialed digits. Upon receiving the digits and if the digits are determined as being a call directed to an outside party, then the CPU 24A, 24B, 24C may seize an outgoing trunk line 19A, 19B, 19C and send a call alert followed by the dialed digits. Where the alert is answered by a call connection acknowledgment, the CPU 24A, 24B, 24C completes the connection between the port of the agent (e.g., 18A, 18B, 18C) and the port of the seized trunk line.

If the call is directed to another agent 18A, 18B, 18C or some other party within the organization, then the CPU 24A, 24B may identify the port to which the calling party is to be connected by reference to a look-up table within memory 26A, 26B, 26C. Upon locating the party, the CPU 24A, 24B, 24C may then cause a connection to be set-up between appropriate ports within the switch 14A, 14B, 14C between the calling and called party.

Where the status change is a call alert signal on an incoming trunk line (or control channel associated with the incoming trunk line), then the CPU 24A, 24B, 24C may send an acknowledge message to the PSTN 16 accepting the call. The PSTN 16 may respond with the forwarding of DNIS and ANI messages, identifying the called and calling party.

Upon accepting the call, the CPU 24A, 24B, 24C first stores the DNIS and ANI numbers in a termination table of the memory 26A, 26B, 26C. More specifically, the CPU 24A, 24B, 24C maintains a table of call information for each port of the switch 14A, 14B, 14C. Where a call is accepted on an incoming trunk line, the CPU 24A, 24B, 24C enters the DNIS and ANI number into the table for the incoming trunk line upon which the call is received.

In addition to updating the termination table within memory 26A, 26B, 26C, the CPU 24A, 24B, 24C also generates a call identifier (also sometimes referred to as a call ID or sequence number) for the call, unique to the switch 14A, 14B, 14C. The call identifier along with the ANI and DNIS numbers may then be sent to the host 12 as part of a call arrival message. Delivery of the ANI and DNIS numbers and call identifier allows the host 12 to create a unique call record for the call in memory 28, in a call record area of memory 28 reserved for the switch 14A. The call record may be used to retrieve customer records for delivery to an appropriate display terminal 22A, 22B, 22C once the call has been assigned to an agent 18A, 18B, 18C.

The CPU 24A, 24B, 24C then, by reference to the DNIS number, determines the identity of agent 18A, 18B, 18C to which the call is to be directed. For example, the DNIS number may be used to differentiate between calls directed to a first telephone number arriving on a first incoming trunk group directed to a sales group of the organization from calls directed to a service group of the organization. Since agents servicing sales calls would, in most cases, not handle calls directed to service, the DNIS number provides a convenient means of differentiating between two or more types of calls.

Upon determining the identity of the agent 18A, 18B, 18C (or group of agents) the CPU 24A, 24B, 24C instructs the switch 14A, 14B, 14C to internally connect the port of the incoming trunk to a port of one of the identified agents.

Where the call has been connected to an agent, the CPU 24A, 24B, 24C stores the port number of the identified agent in the termination table for the port of the incoming trunk. Likewise, the CPU 24A, 24B, 24C stores the port identifier of the incoming trunk in the termination table of the identified agent.

To complete set-up of the call to the identified agent, the CPU 24A, 24B, 24C sends a call completion message to the host 12. The call completion message includes at least a port identifier of the identified agent and the call identifier. The information of the call completion message is stored in the call record previously created in conjunction with arrival of the call arrival message. The port identifier and call identifier allows the host 12 to deliver customer data to the specific display terminal 22A, 22B, 22C of the agent to which the call was delivered.

In the alternative, if all of the agents (e.g., 18A) were busy, then an incoming call (e.g., received on incoming trunk T1 of the first switch 14A) would be placed in a queue. While in the queue, the CPU 24A would compare certain parameters of each call in the queue (e.g., time in the queue) with a set of overflow threshold values. Where the parameters of the queued call exceed one or more of the overflow threshold values, the call may be considered a candidate for overflow to another switch, or another agent 18A, 18B, 18C.

Figure 2:
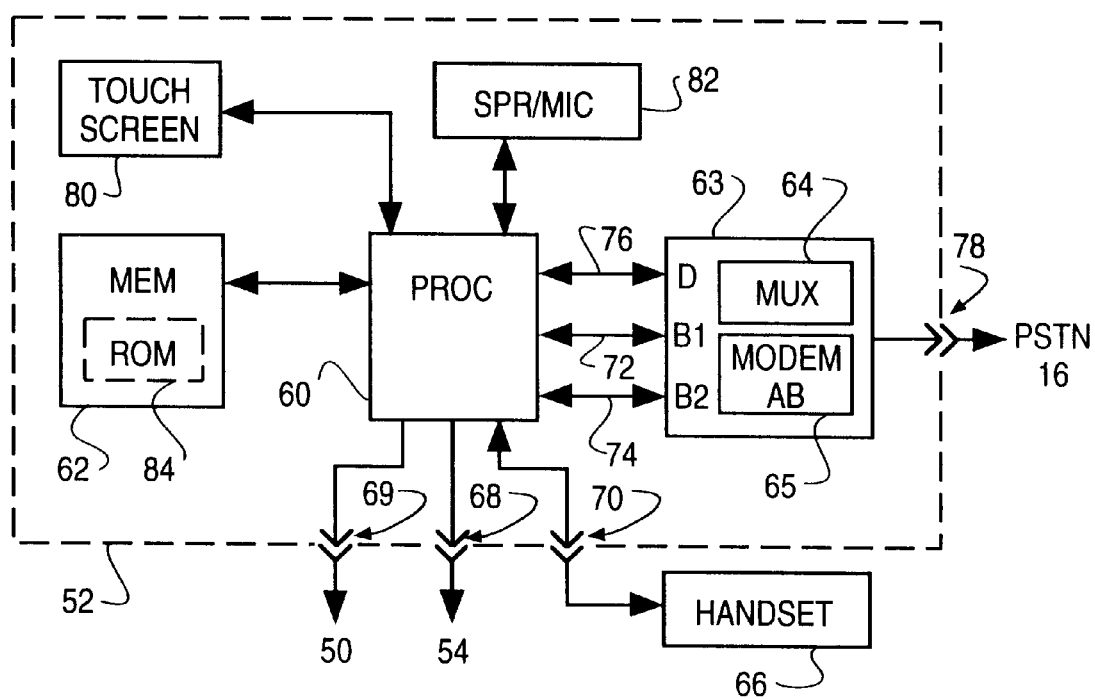
FIG. 2 is a block diagram of the telecommutable platform of FIG. 1.

FIG. 2 may be used as a block digram 52 of one of the terminals 52A, 52B, 52C of the agent positions 18A, 18B, 18C shown in FIG. 1. Keyboard connection 50 of FIG. 2 may be used to indicated a connection to any one of keyboards 50A, 50B, 50C. Display connection 54 of FIG. 2 may be used to indicated a connection to any one of displays 54A, 54B, 54C.

The agent terminal 52 is constructed as a lightweight, rugged, portable telecommutable platform that may be easily carried between home or office. To facilitate portability, the terminal 52 is equipped with a number of plugs. For instance, a first plug 69 may be used to connect the terminal 52 with a display 50. A second plug 68 may be used to connect the terminal 52 to a keyboard 54. A third plug 78 may be used to locally connect the terminal to a ISDN facility within the telephonic network 16. A fourth plug 70 may be used to connect the terminal 52 an external telephone handset 66.

Where an external handset 66 is not available, an internal speaker-microphone (SPR/MIC) 82 may be used. Also, where a keyboard 54 and display 50 are not available, the terminal 52 may be provided with an internal touch-screen 80.

Under the illustrated embodiment, the terminal 52 functions to provide a duplex voice and data connection with a switch 11A, 11B, 11C. The connection may be provided through a modulation interface (MI) 63, that may have facilities for an ISDN basic rate interface (BRI), an asynchronous digital subscriber link (ADSL), and for analog voice channels. The MI 63 is constructed as shown in FIG. 2 with a multiplexer 64 for use with a BRI connection and modem 65 for use with ASDL and analog connections.

The MI 63 interfaces with the processor 60 through a D connection 76, a B1 connection 72 and a B2 connection 74. While the interface 72, 74, 76 is shown in terms of an ISDN format, it may be assumed the connection to the PSTN 16 from the MI 63 may be ISDN, ASDL, or analog. For instance, if the connection to the PSTN 16 consisted of two analog lines, then the D channel 76 would be used for set up and control of two modems 65. The first connection (B1) 72 in such case would transfer voice or data to the first modem 65 and a second connection (B2) 74 would transfer voice or data to the second modem 65.

Alternatively, the voice and data channels may be set up through a single voice channel of the PSTN 16. In this case, the multiplexer 64 and a single modem 65 may be used in series to multiplex the audio information from a voice channel (e.g., connection 72) with data from a data channel (e.g., connection 74). The interleaved voice and data in such case may occupy the voice channel through the PSTN 16 under a time division multplex (TDM) format.

Where a BRI interface is used, the BRI would include a D-channel and two B-channels. Of the two B-channels, a first B1 may be dedicated to data communication with a host 12 of the ACD 10. The second channel B2 may be dedicated to voice communication.

A multiplexer (MUX) 64 within the MI 63 of the terminal 52 recognizes and decodes the D, B1 and B2 channels of the BRI and routes data on the respective channels between their respective destinations. For example, voice data received from the PSTN 16 on the B2 channel 74 may be routed through the processor 60 to either the internal SPR/MIC 82 or to the external handset 66. Voice data from the handset 66 or internal SPR/MIC 82 is routed by the MUX 64 through the BRI to the PSTN 16 for delivery to a particular port of a switch 11A, 11B, 11C of the ACD system 10.

Data and control information received from the PSTN 16 on the D and B1 channels are routed to the processor 60. Data received on the B1 channel 72 may be processed within the processor 60, stored in memory 62 or formatted and displayed on internal or external displays 50, 80. Similarly data from the keyboard 54 or touch-screen 80 may be processed within the processor 60, stored in memory 62 or transmitted to a port of the ACD system 10.

Upon start-up, the processor 60 loads a set of program instructions from a read only memory (ROM) 84 and begin executing the program. As one of the features of the program, the processor 60 may display a connect query to the user (not shown) of the agent terminal 18A, 18D, 18C.

If the user enters a yes, the processor 60 of a terminal (e.g., terminal 18A) seizes the connection with the PSTN 16 and determines the type of connection. If the processor 60 determines that the connection is analog, then the processor 60 may send a predetermined telephone number to each of the modems 65 of its respective voice and data channels. The PSTN 16 receives the telephone numbers and forms a pair of connections between the terminal 52 and the ACD (e.g., 11A).

Upon set up of the call connnections with the ACD 11A, the modems 65 transmit an identifier of either a voice or data channel and an identifier of the agent terminal 52. Upon verification of the identification of the caller on the data channel, the CPU 24A would instruct the switch 14A to form a connection between the data channel and the host 12. Similarly, upon verification of the identification of the caller on the voice channel, the CPU 24A would correlate the two channels through the PSTN 16 and add the agent 52 and ports of arrival on the switch 14A to a list of available agents in a memory 28 of the host 12.

Where the processor 60 determines that the connection with the PSTN 16 has ISDN capability, the processor 60 seizes the D-channel and attempts to set up a BRI connection with a switch (e.g., 11A) of the ACD system 10 through the PSTN 16. In attempting to set up a BRI channel, the processor transmits a channel request to a local switch (not shown) of the PSTN 16. The channel request (SETUP message) includes a telephone number of the switch 11A as well as a set of characteristics of the requested BRI channel, including a bearer capability, a channel identification and network specific facilities. For example, Octet 3 of the channel identification portion of the SETUP message may be used to indicate that two B-channels are being requested. The binary facility coding (Octet 4) may be used to indicate that a Private Virtual Network type service is being requested.

Upon receiving the request, the PSTN 16 would act to identify and set up the requested channels between the agent position 18A and switch 11A. The PSTN 16 would also return a response to the terminal 18A acknowledging the request and identifying a set of channels B1, B2 of the BRI. The PSTN 16 would also announcement the call arrival to the switch 11A.

The call arrival at the switch 11A would typically include an DNIS number identifying the call target and an ANI identifying a telephone number of the caller. Where the agent 18A is calling from a home telephone, the CPU 24A may use the ANI number to identify the call as an agent signing on to receive calls from outside customer units 15. Alternatively, where a special number is provided for agent sign-on, the CPU 24A may recognize this type of call by the DNIS number. As a further alternative, the processor 60 of the agent position 18A may also sent a user-to-user information element through the D-channel to the switch 11A identifying the call as an agent sign-on.

Upon receiving the call and recognizing the call as a sign-on by an agent 18A, the CPU 24A may monitor the connection for a personal identification number (PIN). The CPU 24A may either monitor both connections B1, B2 for the PIN number or only the data channel B1 based upon an identifier of the B1 channel associated with call setup. The CPU 24A may then verify the PIN by reference to an internal memory 26A. Upon verifying the PIN number the CPU 24A may send a message to the host 12 announcing sign on of the agent 18A. The CPU 24A may then instruct the switch 11A to form a connection between the port to which the data channel B1 is connected and the host 12 through data connection path 13A.

Alternatively, the CPU 24A, upon recognizing the call as a sign-on message, may connect both channels B1, B2, or only the data channel B1 to the host 12 through connection path 13A. The host 12 may receive and verify the PIN by reference to an identical PIN of the agent stored in a database 28. The host 12 may then send a message path back to the CPU 24A instructing the CPU 24A to disconnect the B2 channel from the host 12 and hold the port of the B2 channel in reserve pending arrival of the next customer call. The CPU 24A and host 12 store in their respective memories an identifier of the port to which the agent's voice channel B2 is connected and the port to which the agent's data channel B1 is connected.

The CPU 24A via the PIN number of the agent recovers a set of call handling qualifications of the agent by reference to memory 26A. Upon receiving a call from a customer unit 15 having a matching set of call requirements, the CPU 24A may select the agent 18A to service the call. To begin setting up the call, the CPU 24A may transfer an identifier of the caller or call requirments (e.g., ANI, DNIS, etc.) and an identifier of the agent 18A (e.g., PIN number, port numbers of the B1 and B2 channels, etc.) to the host 12. The CPU 24A also instructs the switch 11A to form a connection between the incoming port of the customer 15 and voice port (i.e., the B2 channel) of the agent 18A.

The host 12 upon receiving the set up parameters, retrieves the customer records from the database memory 28 and transfers the records through the interconnect 13A, switch 11A and data channel B1 to the agent 18A.

The connection of the customer 15 to the B2 channel of the agent 18A causes a voice connection to be created between the customer 15 and agent 18A throught the voice connection B2. The customer records may also be delivered through the data connection B1 and be displayed on the terminal display 50A at the same time as call delivery.

During the conversation with the customer, the voice channel B2 of the terminal 52 keeps the agent in direct contact with the customer and the data channel B1 provides customer information to the agent via a direct contact with the host 12 and database 28. During the conversation, the agent may enter customer data through the keyboard 54A which may be stored locally in memory 62, or may be transferred back to the host 12 immediately. The agent may also request further information by appropriate commands entered through the keyboard 54A. The commands may be interpreted by the processor 60 and transmitted back to the host 12 through the data channel B1. The host 12, in turn, may receive and transmit additional information to the agent through the agent terminal 54. The additional information may be stored in memory 62 for inclusion in a final customer order or may be displayed immediately on the display 50A.

Under an embodiment of the invention, the terminal 18 may have a variety of personalities dependent upon the software present with the memory 62. For example, the terminal 52 may be fabricated with only a boot program present within ROM 84. The boot program may only contain sufficient software to set up a single B-channel for purposes of accessing a server (e.g., host 12 or some other database) and for displaying a menu of options on the display 50A. The user of the terminal 18A may enter an option resulting in the downloading of a particular suite of programs.

For example, the suite of programs may support a salesman in making sales calls to customers. Instead of accessing a gateway for voice and data through a single switch 11A, the terminal 52 may direct data and voice paths B1, B2 to different destinations. For example, the voice path B2 may be to a public switch of the PSTN 16 and then to a customer, while the data path B1 may be to a server through a different switch or location. The data path may also be a connection to a web page through the Internet.

A specific embodiment of a method and apparatus of providing a telecommutable platform according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claimed herein.

We claim:

1. A portable apparatus providing a communication interface between a local agent and a switch of an automatic call distributor at a remote location through a first and second voice channel of the public switched telephone network, such apparatus comprising:

a portable enclosure;

a voice transceiver disposed within the portable enclosure, coupled to the first channel of the public switched telephone network and adapted to form a connection with a first port of the switch of the automatic call distributor; and a data transceiver disposed within the portable enclosure, coupled to the second channel of the public switched telephone network and adapted to form a connection with a second port of the switch of the automatic call distributor.

2. The portable apparatus as in claim 1 wherein the first and second paths further comprise an ISDN and an ADSL connection, respectively.

3. The portable apparatus as in claim 1 wherein the first and second paths further comprise an ISDN and an analog connection, respectively.

4. The portable apparatus as in claim 1 wherein the first and second paths further comprise an analog and an ADSL connection, respectively.

5. The portable apparatus as in claim 1 wherein the first and second paths further comprise two ADSL connections.

6. The portable apparatus as in claim 1 wherein the first and second paths further comprise two analog connections.

7. The portable apparatus as in claim 1 wherein the first and second paths further comprises a first and second channel of an ISDN primary rate interface.

8. The portable apparatus as in claim 7 wherein the data transceiver further comprises a processor disposed within the portable enclosure which couples data between a user data interface of the local agent and the data transceiver.

9. The portable apparatus as in claim 8 wherein the user data interface further comprises a display coupled to the portable apparatus which presents data received by the processor from the automatic call distributor over the second channel to the agent under a visual format.

10. The portable apparatus as in claim 9 wherein the user data interface further comprises a releasable plug for coupling the display to the portable apparatus.

11. The portable apparatus as in claim 8 wherein the user data interface further comprises a keyboard coupled to the portable apparatus which presents data entered by the agent to the processor for transmission over the second channel to the automatic call distributor.

12. The portable apparatus as in claim 11 wherein the user data interface further comprises a releasable plug for coupling the keyboard to the portable apparatus.

13. The portable apparatus as in claim 8 wherein the user data interface further comprises a touch-screen display coupled to the portable apparatus which transceives data with from the automatic call distributor over the second channel.

14. The portable apparatus as in claim 7 wherein the voice transceiver further comprises a digital signal processor disposed within the portable enclosure and coupling voice data between the local agent and the voice transceiver.

15. The portable apparatus as in claim 14 further comprising a speaker which couples voice data received by the digital signal processor on the first channel to the agent under an audible format.

16. The portable apparatus as in claim 14 further comprising a microphone which couples voice data from the agent to the digital signal processor for transmission to the automatic call distributor on the first channel.

17. The portable apparatus as in claim 7 further comprising a channel setup controller which transmits a setup message to an ISDN controller of the public switched telephone network over a control channel of the primary rate interface specifying a bearer capability and channel identification.

18. The portable apparatus as in claim 17 further comprising a channel synchronization controller which receives a setup response identifying the first and second communications channel of the primary rate interface.

19. A method of providing a duplex voice/data channel through a public switched telephone network between a portable communication device of a local agent and a switch of the automatic call distributor at a remote location, such method comprising the steps of:

transmitting a request for allocation of a first and second communication channel through a primary rate interface of an ISDN facility of the public switched telephone network;

receiving a channel allocation from the ISDN facility for the first and second channels;

allocating the first channel for two-way voice communication between the agent and the switch of the automatic call distributor; and allocating the second channel for two-way data exchange between the agent and the switch of the automatic call distributor.

20. The method as in claim 19 further comprising coupling a telephone handset to the portable device.

21. The method as in claim 19 further comprising coupling a display device to the portable device.

22. The method as in claim 19 further comprising coupling a keyboard to the portable device.

23. The method as in claim 19 further comprising coupling a touch-screen display to the portable device.

24. The method as in claim 19 further comprising booting-up the portable device from a deactivated state by searching a read only memory.

25. The method as in claim 19 further comprising finding and executing a communication program which sets up a telephone connection.

26. The method as in claim 25 further comprising dialing a telephone number of a server through the telephone connection.

27. The method as in claim 26 further comprising downloading an operational program for the portable device from the server over the telephone connection to a random access memory within the portable device.

28. Apparatus for providing a duplex voice/data channel through a public switched telephone network between a portable communication device of a local agent and a switch of an automatic call distributor at a remote location, such method comprising:

means for transmitting a request for allocation of a first and second communication channel through a primary rate interface of an ISDN facility of the public switched telephone network;

means for receiving a channel allocation from the ISDN facility for the first and second channels;

means for allocating the first channel for two-way voice communication between the agent and a first port of the switch of the automatic call distributor; and means for allocating the second channel for two-way data exchange between the agent and a second port of the switch of the automatic call distributor.

29. The apparatus as in claim 28 further comprising means for coupling a telephone handset to the portable device.

30. The apparatus as in claim 28 further comprising means for coupling a display device to the portable device.

31. The apparatus as in claim 28 further comprising means for coupling a keyboard to the portable device.

32. The apparatus as in claim 28 wherein the means for allocating the first and second channels further comprises means for processing a set of control instructions.

33. The apparatus as in claim 31 further comprising means for storing a set of control instructions.

34. The apparatus as in claim 32 further comprising means for downloading a set of instructions to the means for storing.

35. A portable apparatus for use with an automatic call distributor from a remote location and providing a communication interface through a switch of the automatic call distributor between a server of the automatic call distributor and an agent using the portable apparatus, such apparatus comprising:

a portable enclosure;

a voice transceiver disposed within the portable enclosure and coupled through the telecommunications interface to a first port of the switch;

a data transceiver disposed within the portable enclosure and coupled through the telecommunication interface to a second port of the switch;

a read only memory disposed within the portable enclosure containing a boot program controllable by the local agent for downloading personality characteristics for the portable apparatus from the server through the switch;

a processor disposed within the portable enclosure which operates under the downloaded personality characteristics and which couples data between a user data interface of the local agent and the data transceiver; and a digital signal processor disposed within the portable enclosure coupling voice data between an audio user interface of the local agent and the voice transceiver.

36. A portable apparatus providing a voice communication path between a first person and a second person through a switch of an automatic call distributor and also a data communication path through the switch of an automatic call distributor between a terminal of the first person and a database of the automatic call distributor, said automatic call distributor and database being located at a remote location from the first person and said voice and data communication paths being created between the switch and portable apparatus through a single ISDN primary rate interface of the public switched telephone network, such apparatus comprising:

a portable enclosure;

a voice transceiver disposed within the portable enclosure coupled through a first channel of the interface to a first port of the switch of the automatic call distributor; and a data transceiver disposed within the portable enclosure coupled through a second channel of the interface to a second port of the switch of the automatic call distributor.

* * * * *